US008098606B2

(12) United States Patent
Dale et al.

(10) Patent No.: US 8,098,606 B2
(45) Date of Patent: Jan. 17, 2012

(54) MODIFIED UPSTREAM CHANNEL DESCRIPTOR MESSAGES FOR DOCSIS-BASED BROADBAND COMMUNICATION SYSTEMS

(75) Inventors: Mark Dale, Laguna Hills, CA (US); David Hartman, Laguna Hills, CA (US); Dorothy Lin, Laguna Beach, CA (US); Rocco Brescia, Newport Coast, CA (US); Alan Gin, Corona Del Mar, CA (US); Ravi Bhaskaran, Irvine, CA (US); Jen-chieh Chien, Lake Forest, CA (US); Adel Fanous, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1474 days.

(21) Appl. No.: 10/420,805

(22) Filed: Apr. 23, 2003
(Under 37 CFR 1.47)

(65) Prior Publication Data
US 2004/0017830 A1    Jan. 29, 2004

Related U.S. Application Data

(60) Provisional application No. 60/374,551, filed on Apr. 23, 2002, provisional application No. 60/441,312, filed on Jan. 22, 2003.

(51) Int. Cl.
*H04H 20/71* (2008.01)
*H04B 7/185* (2006.01)
*H04J 3/16* (2006.01)
*H04N 7/20* (2006.01)
(52) U.S. Cl. ........... 370/312; 370/316; 370/471; 725/64
(58) Field of Classification Search ............... 370/471, 370/312, 316, 325
See application file for complete search history.

(56) References Cited

U.S. PATENT DOCUMENTS

| 6,070,074 | A  | * | 5/2000  | Perahia et al. ............ 455/430 |
| 6,169,728 | B1 |   | 1/2001  | Perreault et al. |
| 6,459,703 | B1 |   | 10/2002 | Grimwood et al. |
| 6,594,467 | B2 |   | 7/2003  | Asia et al. |
| 6,625,118 | B1 |   | 9/2003  | Hadi Salim et al. |
| 6,690,655 | B1 |   | 2/2004  | Miner et al. |
| 6,741,555 | B1 |   | 5/2004  | Li et al. |

(Continued)

OTHER PUBLICATIONS

Data-Over-Cable Service Interface Specifications, Radio Frequency Interface Specification, SP-RFIv1.1-I09-020830, Cable Television Laboratories, Inc., 1999-2002.

(Continued)

*Primary Examiner* — Kwang B Yao
*Assistant Examiner* — Jutai Kao
(74) *Attorney, Agent, or Firm* — Sterne Kessler Goldstein & Fox, PLLC

(57) ABSTRACT

A method, apparatus and computer program product for generating and processing upstream channel descriptor (UCD) messages in a DOCSIS-based broadband communications system, such as a DOCSIS-based two-way satellite communications system, is provided. A satellite modem termination system (SMTS) generates a UCD message that includes one or more standard parameters pertaining to an upstream channel of the two-way satellite communications system, wherein the one or more standard parameters are defined in accordance with the DOCSIS protocol, and one or more satellite application-specific parameters pertaining to the upstream channel, wherein the one or more satellite application specific parameters are not provided for by the DOCSIS protocol. The UCD message is transmitted to a satellite modem that extracts both the standard and satellite application-specific parameters for use in managing communication over the upstream channel.

12 Claims, 9 Drawing Sheets

U.S. PATENT DOCUMENTS

| | | |
|---|---|---|
| 6,742,187 B1 | 5/2004 | Vogel |
| 6,801,537 B1 | 10/2004 | Kubbar |
| 6,804,532 B1 | 10/2004 | Moon et al. |
| 6,807,193 B1 | 10/2004 | Beser |
| 6,853,680 B1 | 2/2005 | Nikolich |
| 6,944,881 B1 * | 9/2005 | Vogel ............................. 725/111 |
| 6,963,541 B1 * | 11/2005 | Vogel et al. .................. 370/252 |
| 6,987,741 B2 * | 1/2006 | Kelly et al. .................. 370/321 |
| 7,051,355 B1 * | 5/2006 | Inose et al. ...................... 725/71 |
| 7,068,597 B1 * | 6/2006 | Fijolek et al. ................. 370/230 |
| 7,139,247 B2 * | 11/2006 | Desai et al. .................. 370/255 |
| 7,145,888 B2 | 12/2006 | Dale et al. |
| 7,203,158 B2 * | 4/2007 | Oshima et al. ................ 370/208 |
| 2002/0009051 A1 | 1/2002 | Cloonan |
| 2002/0021711 A1 | 2/2002 | Gummalla et al. |
| 2002/0031120 A1 | 3/2002 | Rakib |
| 2002/0036985 A1 | 3/2002 | Jonas et al. |
| 2003/0026283 A1 | 2/2003 | Currivan et al. |
| 2003/0058794 A1 | 3/2003 | Pantelias et al. |
| 2003/0069926 A1 | 4/2003 | Weaver et al. |
| 2003/0125033 A1 * | 7/2003 | Rindsberg et al. ............ 455/450 |
| 2003/0147411 A1 | 8/2003 | Goosman |
| 2004/0162020 A1 | 8/2004 | Dale et al. |
| 2007/0147281 A1 | 6/2007 | Dale et al. |
| 2009/0180490 A1 * | 7/2009 | Beser ............................ 370/431 |

OTHER PUBLICATIONS

Digital Video Broadcasting (DVB); Interaction Channel for Satellite Distribution Systems,ETSI EN 301 790 v1.2.2 (Dec. 2000), European Telecommunications Standards Institute, European Broadcasting Union, 2000.

International Search Report for Internation Application No. PCT/US03/12642, dated Dec. 18, 2003, 6 pages.

Brown, Peter J., "Industry Players: Pushing Different Standards As Sector Enters New Phase," at http://telecomweb.com/cgi/pub/via/via05020504.html, 7 pages, May 2, 2005 (printed May 27, 2005).

* cited by examiner

MODIFIED UPSTREAM CHANNEL DESCRIPTOR MESSAGES FOR DOCSIS-BASED BROADBAND COMMUNICATION SYSTEMS

CROSS-REFERENCE TO RELATED APPLICATIONS

This application claims the benefit of U.S. Provisional Application Ser. No. 60/374,551, entitled "Modified Upstream Channel Descriptor Messages for DOCSIS Based Broadband Communication Systems," filed Apr. 23, 2002, and U.S. Provisional Application Ser. No.60/441,312, entitled "Modified Upstream Channel Descriptor Messages for DOCSIS-based Broadband Communication Systems," filed Jan. 22, 2003.The entirety of these applications are incorporated by reference herein.

BACKGROUND OF THE INVENTION

1. Field of the Invention

The present invention generally relates to broadband communication systems. In particular, the present invention relates to broadband communication systems that use the Data Over Cable Service Interface Specification (DOCSIS) media access protocol or any derivatives, including but not limited to a DOCSIS-compliant two-way satellite communications system.

2. Background

DOCSIS (Data Over Cable Service Interface Specification) generally refers to a group of specifications published by CableLabs that define industry standards for cable headend and cable modem equipment. In particular, DOCSIS specifies modulation schemes and the protocol for exchanging bidirectional signals over cable. Recently, however, the use of the DOCSIS protocol has expanded beyond the cable industry. For example, modified DOCSIS technology is in development by both satellite and wireless providers for two-way access into subscriber homes. Furthermore, DSL suppliers are adopting DOCSIS-like processes to help them finally converge on an interoperable standard.

Common to all DOCSIS-based broadband data communication architectures is the transfer of data between a central location and many remote subscribers over a shared communications medium. The terms used to describe the central location vary depending on the type of communication architecture: for example, in cable systems, the central location is typically referred to as the headend, in broadband terrestrial fixed wireless systems, it is typically referred to as a wireless access termination system (WATS), and in two-way satellite communication systems, it is typically referred to as the satellite gateway. Terms used to describe subscriber equipment also vary depending on the type of communication architecture: for example, in cable systems, such equipment is typically referred to as a cable modem (CM), in broadband terrestrial fixed wireless systems, it is typically referred to as a wireless modem (WM), and in two-way satellite communication systems, it is typically referred to as a satellite modem (SM).

For the purposes of the description provided herein, terminology pertaining to two-way satellite communication systems will be used. However, as will be discussed in more detail below, the present invention is not limited to two-way satellite communication systems, and may be used, for example, in any DOCSIS-based broadband communication system.

FIG. 1 illustrates the basic elements of a two-way satellite communication system 100. System 100 includes a satellite gateway 102 with associated antenna and transceiver 104, a satellite 106, and a satellite modem 108 with associated antenna and transceiver 110. As will be appreciated by persons skilled in the relevant art(s), satellite 106 facilitates bidirectional communication between satellite gateway 102 and satellite modem 108. The communication path from satellite gateway 102 to satellite modem 108 is typically referred to as the downstream while the communication path from satellite modem 108 back to satellite gateway 102 is typically referred to as the upstream.

In accordance with DOCSIS, satellite gateway 102 sends media access control (MAC) management messages to satellite modem 108 for a variety of purposes. One of these messages is called an Upstream Channel Descriptor (UCD) message. The purpose of the UCD message is to describe the attributes of a given upstream channel in sufficient detail so as to enable satellite modem 108 to successfully communicate with satellite gateway 102.

It has been observed, however, that additional upstream parameters beyond those defined in the DOCSIS UCD message are required in order to adequately describe a channel for satellite applications. Additionally, it would be desirable to provide additional upstream channel parameters not included in the DOCSIS UCD message to enable more efficient communication between a satellite gateway and satellite modems. Unfortunately, DOCSIS does not provide a vehicle for communicating these additional upstream parameters.

What is needed then, is a mechanism for communicating parameters pertaining to an upstream channel between a central location and subscriber equipment within a DOCSIS-based system, such as a DOCSIS-based two-way satellite communicate system, wherein such parameters are not included in a standard DOCSIS UCD message. Furthermore, the desired mechanism should permit backward-compatibility with conventional DOCSIS-based equipment.

BRIEF SUMMARY OF THE INVENTION

The present invention is directed to a method, apparatus and computer program product for generating and processing upstream channel descriptor (UCD) messages in a DOCSIS-based broadband communications system, such as a DOCSIS-based two-way satellite communications system.

In accordance with an embodiment of the present invention, a satellite modem termination system (SMTS) obtains one or more standard parameters pertaining to an upstream channel of a two-way satellite communications system, wherein the one or more standard parameters are defined in accordance with the DOCSIS protocol. The SMTS also obtains one or more satellite application-specific parameters pertaining to the upstream channel, wherein the one or more satellite application specific parameters are not provided for by the DOCSIS protocol. A UCD message generator within the SMTS generates a UCD message including the one or more standard parameters and the one or more satellite application-specific parameters. The SMTS then broadcasts the UCD message over a downstream channel of the two-way satellite communications system.

In accordance with further embodiments of the present invention, the UCD message generator generates the UCD message by formatting the following fields in the UCD message to include the one or more satellite application-specific parameters: an upstream channel identifier portion of the UCD message; a type/length/value (TLV)-encoded channel information portion of the UCD message, and/or a TLV-encoded burst descriptor portion of the UCD message In accordance with another embodiment of the present invention, a satellite modem receives a UCD message over a downstream channel of a two-way satellite communications system. A UCD message processor within the satellite modem processes the UCD message to extract one or more standard parameters pertaining to an upstream channel of the two-way satellite communications system, wherein the one or more standard parameters are defined in accordance with the DOCSIS protocol. The UCD message processor also processes the UCD message to extract one or more satellite application-specific parameters pertaining to the upstream channel, wherein the one or more satellite application specific parameters are not provided for by the DOCSIS protocol. The satellite modem then utilizes the satellite-application specific parameters to manage communication over the upstream channel of the two-way communications system.

In accordance with further embodiments of the present invention, the UCD message processor processes the UCD message to extract the one or more satellite-application specific parameters by processing the following fields in the UCD message: an upstream channel identifier portion of the UCD message; a type/length/value (TLV)-encoded channel information portion of the UCD message, and/or a TLV-encoded burst descriptor portion of the UCD message

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
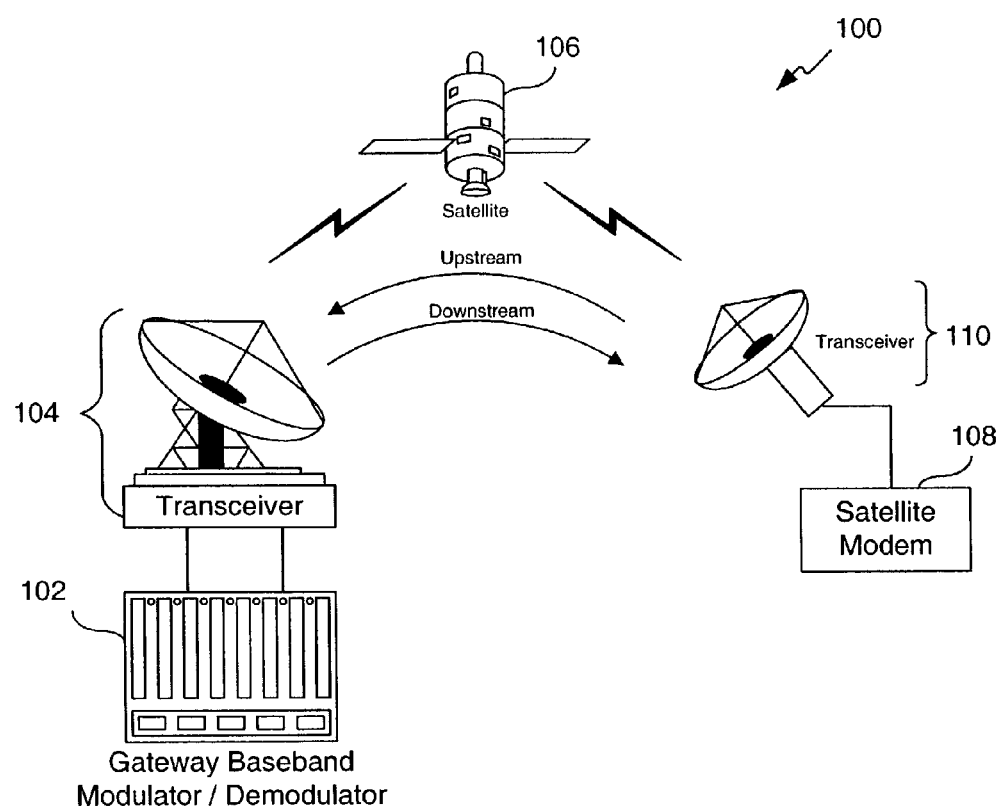
FIG. 1 illustrates the basic elements of a two-way satellite communication system.

The features and advantages of the present invention will become more apparent from the detailed description set forth below when taken in conjunction with the drawings in which like reference characters identify corresponding elements throughout. In the drawings, like reference numbers generally indicate identical, functionally similar, and/or structurally similar elements. The drawings in which an element first appears is indicated by the leftmost digit(s) in the corresponding reference number.

DETAILED DESCRIPTION OF THE INVENTION

A. Overview

Figure 2:
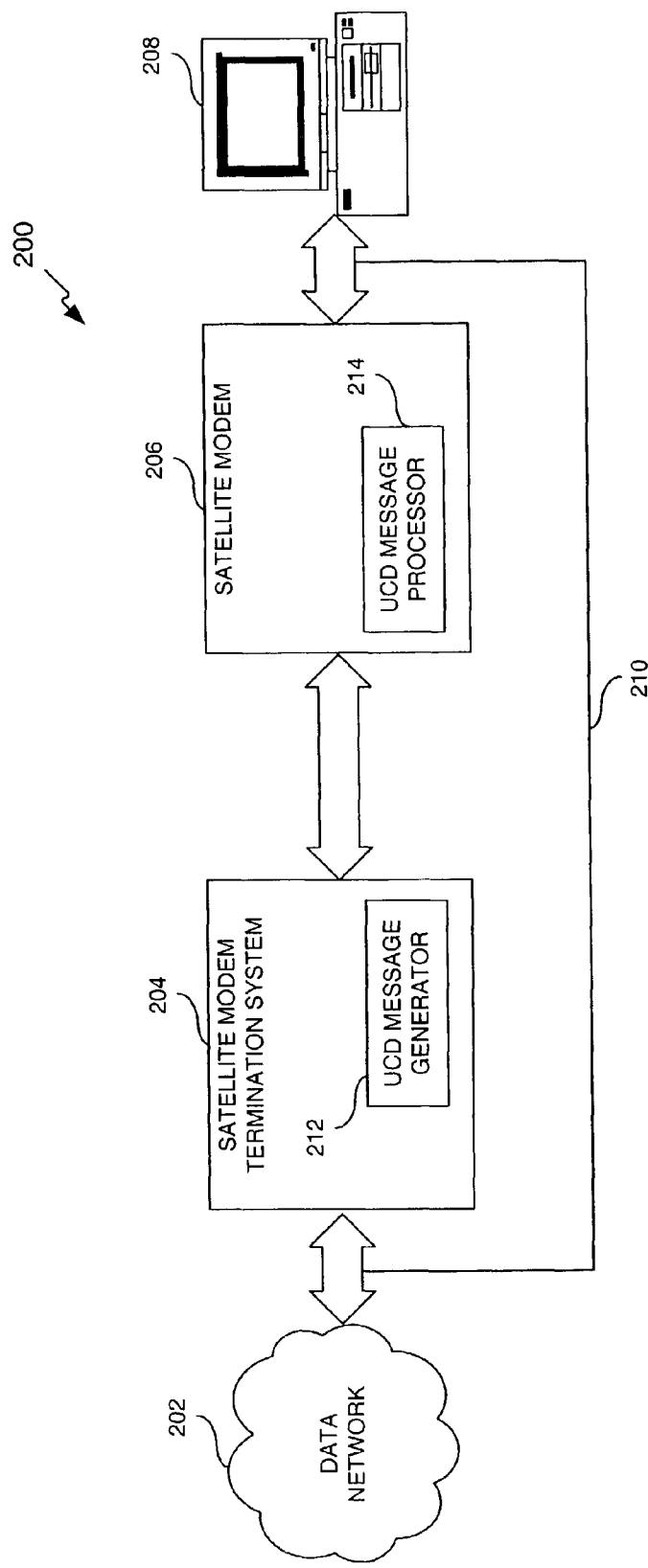
FIG. 2 depicts a two-way satellite communications system in which embodiments of the present invention may operate.

FIG. 2 is a high-level depiction of a two-way satellite communications system 200 in which an embodiment of the present invention may operate. As shown in FIG. 2, two-way satellite communications system 200 includes a satellite modem termination system (SMTS) 204 and at least one satellite modem 206. Two-way satellite communications system 200 utilizes satellites (not shown) to facilitate the transparent bi-directional transfer of data 210, including but not limited to Internet Protocol (IP) traffic, between SMTS 204 and satellite modem 206. To this end, SMTS 204 and satellite modem 206 are each coupled to a transceiver, or transmitter/receiver pair, and antenna (also not shown) for satellite communication purposes. Communication directed from SMTS 204 to satellite modem 206 will be referred to herein as downstream communication, while communication directed from satellite modem 206 to SMTS 204 will be referred to herein as upstream communication.

SMTS 204 comprises part of a satellite gateway and operates, in part, to manage the upstream and downstream transfer of data between the satellite gateway and a plurality of satellite modems, such as satellite modem 206, each of which is located at a customer premises. SMTS 204 broadcasts information downstream to the satellite modems as a continuous transmitted signal in accordance with a time division multiplexing (TDM) technique. Additionally, SMTS 204 controls the upstream transmission of data from the satellite modems to itself by assigning to each satellite modem short grants of time within which to transfer data. In accordance with this technique, each satellite modem may only send information upstream as short burst signals during a transmission opportunity allocated to it by SMTS 204.

As shown in FIG. 2, SMTS 204 further serves as an interface between two-way satellite communications system 200 and a data network 202, which may comprise a wide area network (WAN) such as the Internet. Interface functions performed by SMTS 204 include the transfer of data packets received from satellite modems, such as satellite modem 206, to data network 202, and conversely, the transfer of data packets received from data network 202 to one or more satellite modems, such as satellite modem 206.

As further shown in FIG. 2, satellite modem 206 operates as an interface between two-way satellite communications system 200 and at least one customer premises equipment (CPE) 208. In particular, satellite modem 206 performs the functions necessary to convert downstream signals received via two-way satellite communications systems 200 into data packets suitable for receipt by CPE 208. Additionally, satellite modem 206 performs the functions necessary to convert data packets received from CPE 208 into upstream burst signals suitable for transfer over two-way satellite communications system 200.

Satellite modem 206 is shown supporting only a single CPE 208 for clarity. In general, however, satellite modem 206 is capable of supporting a plurality of CPE for communication via two-way satellite communications system 200. Such CPE may include personal computers, data terminal equipment, telephony devices, broadband media players, network-controlled appliances, or any other device capable of transmitting or receiving data over a packet-switched network.

In two-way satellite communications system 200, SMTS 204 and satellite modem 206 comprise DOCSIS-compatible equipment. In other words, SMTS 204 and satellite modem 206 are interoperable with other SMTS and satellite modem equipment that adhere to the protocols set forth in the DOCSIS Radio Frequency Interface (RFI) Specification published by Cable Labs. The DOCSIS RFI specification is publicly available on the Cable Labs web site (www.cablemodem.com) and is updated from time to time. The current relevant version of the DOCSIS RFI Specification is SP-RFIv1.1-I08-020301, which is incorporated by reference in its entirety herein.

However, in accordance with an embodiment of the present invention, SMTS 204 and satellite modem 206 are also configured to send and receive messages that include parameters that are not provided for by the DOCSIS RFI Specification. In particular, SMTS 204 includes an Upstream Channel Descriptor (UCD) message generator 212 that generates UCD messages that have been modified to include parameters not provided for by the DOCSIS RFI Specification. As will be discussed in more detail herein, these parameters may be included to more adequately describe an upstream channel of two-way satellite communications system 200, or to enable more efficient communication between SMTS 204 and satellite modem 206. As will also be discussed in more detail herein, UCD message generator 212 includes these parameters in a manner that ensures that SMTS 204 will be interoperable with DOCSIS-compliant satellite modems that are not adapted to receive such additional parameters.

In further accordance with an embodiment of the present invention, satellite modem 206 includes a UCD message processor 214 that is configured to receive modified UCD messages transmitted by SMTS 204 and to process them in order to extract both necessary standard DOCSIS parameters as well as the additional parameters included by UCD generator 212. As will be discussed in more detail herein, these parameters are then used by satellite modem 206 in order to more effectively manage upstream communication over two-way satellite communications system 206.

In an embodiment, UCD message generator 212 comprises a part of the Media Access Control (MAC) sub-layer of SMTS 204 and UCD message processor 214 comprises a part of the MAC sub-layer of satellite modem 206. As will be appreciated by persons skilled in the relevant art(s) based on the teachings provided herein, both UCD message generator 212 and UCD message processor 214 may be implemented in software, hardware, or a combination of software and hardware.

Figure 3:
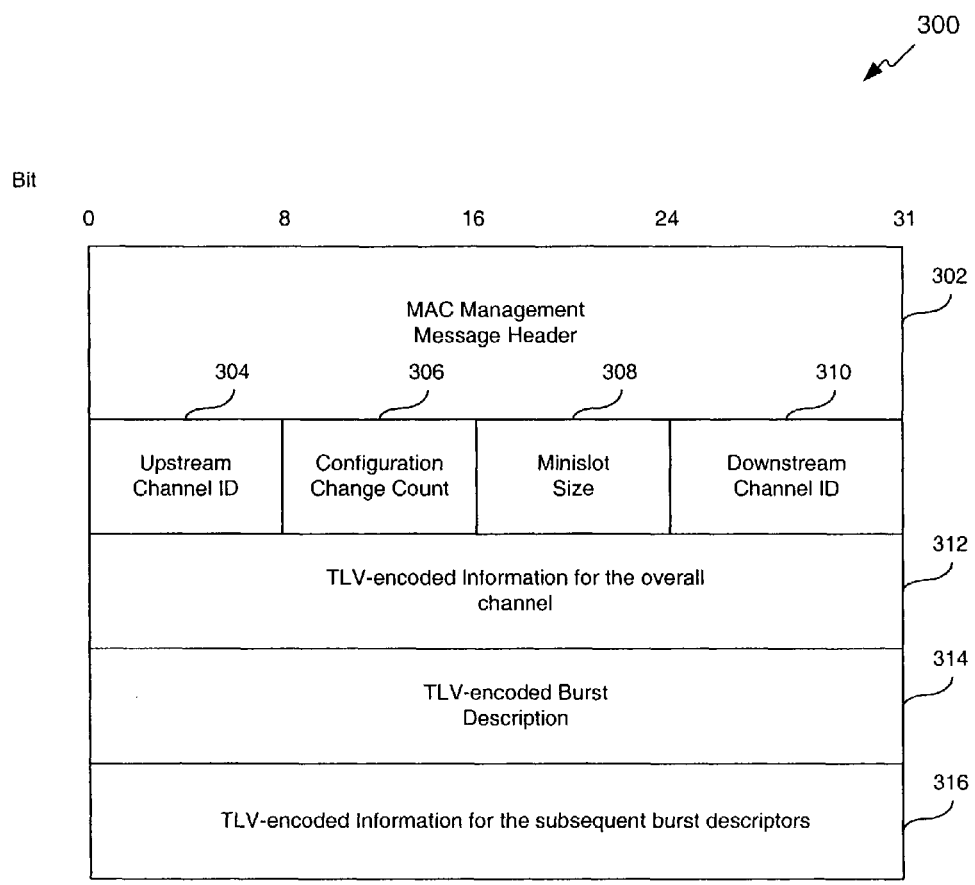
FIG. 3 illustrates a format of an Upstream Channel Descriptor (UCD) message in accordance with the DOCSIS specification.

B. Modification of UCD Messages in Accordance with an Embodiment of the Present Invention FIG. 3 illustrates a format 300 of a standard DOCSIS UCD message. In accordance with an embodiment of the present invention, the DOCSIS UCD message is transmitted by SMTS 204 to a plurality of satellite modems, including satellite modem 206, at a periodic interval to define the characteristics of an upstream channel in two-way satellite communications system 200. SMTS 204 transmits a separate UCD message for each active upstream channel.

As shown in FIG. 3, the DOCSIS UCD message includes a plurality of fields, including a MAC Management Message Header 302, an Upstream Channel Identifier (ID) 304, a Configuration Change Count 306, a Minislot Size 308, a Downstream Channel ID 310, TLV-encoded Information for the Overall Channel 312, TLV-encoded Burst Description 314, and TLV-encoded Information for the Subsequent Burst Descriptors 316. A description of each of these fields is provided in the DOCSIS RFI Specification (Ver. SP-RFIv1.1-I08-020301) which is incorporated by reference in its entirety herein.

In accordance with an embodiment of the present invention, UCD message generator 212 within SMTS 204 adds additional parameters to the UCD message that are not provided for by DOCSIS to enable satellite applications. However, UCD generator 212 maintains the basic format of the UCD message as set forth in FIG. 3. As a result, hardware compatibility with existing DOCSIS-compliant equipment, such as existing DOCSIS-compliant satellite modems, can be achieved.

In an embodiment, UCD message generator 212 adds additional parameters by modifying one or more of three specific areas of the DOCSIS UCD message: (1)Upstream Channel ID 304, (2) TLV-encoded Information for the Overall Channel 312, and/or (3) TLV-encoded Burst Description 314.

1. Modifications to Upstream Channel ID Field

The Upstream Channel ID 304 comprises an 8-bit field that identifies the upstream channel to which the UCD message refers. In accordance with an embodiment of the present invention, the most significant bit (MSB) of the Upstream Channel ID 304 is used by SMTS 204 as an "Entry Order Wire Indicator" (EOWI) to indicate whether the upstream channel described by the UCD message supports initial maintenance. As will be appreciated by persons skilled in the relevant art(s), initial maintenance refers to a DOCSIS protocol useful for providing accurate timing alignment between SMTS 204 and satellite modem 206.

Once SMTS 204 has modified the UCD message in this manner, it transmits it downstream to the satellite modems. Satellite modem 206 receives the modified UCD message and reads the EOWI bit in the Upstream Channel ID 304. Based on the value of the EOWI bit, satellite modem 206 then quickly determines whether to attempt to use the channel identified by the UCD message for the initial ranging and registration protocols associated with initial maintenance. This technique can both speed up the registration process as well as allow the satellite gateway to reduce MAC overhead by selectively eliminating maintenance opportunities on many of the upstream channels.

In accordance with an example embodiment of the present invention, the EOWI bit in the Upstream Channel ID 304 is set to 1 to indicate a channel that does not support initial maintenance and is set to 0 to indicate a channel that does support it. Alternately, the EOWI bit is set to 0 to indicate a channel that does support initial maintenance and is set to 1 to indicate a channel that does not. It should be noted that limiting the Upstream Channel ID 304 to the 7 least significant bits (LSBs) will effectively restrict the number of upstream channels per downstream channel (or upstream channels per MAC domain) to 128. However, this is not expected to be a significant restriction in practice.

2. Modifications to TLV-Encoded Information for the Overall Channel

As required by the DOCSIS RFI specification, all other parameters in the UCD message other than MAC Management Message Header 302, Upstream Channel ID 304, Configuration Change Count 306, Minislot Size 308 and Downstream Channel ID 310 must be coded as Type-Length-Value (TLV) tuples in which the type and length fields are each one octet long. Section 6.3.3 of the DOCSIS RFI specification specifies only four types of TLV tuples (types 1-4) corresponding to TLV-Encoded Information for the Overall Channel 312. In accordance with an embodiment of the present invention, SMTS 204 generates six additional TLV types (types 7-12) as part of TLV-Encoded Information for the Overall Channel 312. These additional TLV types are set forth in Table 1.

TABLE 1

TLV-Encoded Information for the Overall Channel

| Name | Type (1 byte) | Length (1 byte) | Value (variable length) |
|---|---|---|---|
| Symbol Rate | 1 | 1 | See DOCSIS RFI Specification |
| Frequency | 2 | 4 | See DOCSIS RFI Specification |
| Preamble Pattern | 3 | 1–128 | See DOCSIS RFI Specification |
| Burst Descriptor | 4 | 2 | See DOCSIS REI Specification and TABLE 2 below |
| Mean Ranging Offset | 7 | 4 | Initial ranging offset in milliseconds |
| Periodic Ranging Interval | 8 | 4 | Periodic ranging interval in seconds |
| Upstream Inner Code Rate | 9 | 1 | 1 = rate 1 (disabled), 2 = rate ½, 3 = rate ¾ |
| Block Interleaver Enable | 10 | 1 | 1 = enabled, 2 = disabled |
| Inner Code Block Size | 11 | 2 | Block size in QPSK symbols |
| Inner Code Trailing Symbols | 12 | 1 | Number of QPSK trailing symbols (flush symbols) |

As shown in Table 1, the portion of the UCD message that includes TLV-encoded information for the overall channel is modified to include a mean ranging offset TLV tuple (type 7), a periodic ranging interval TLV tuple (type 8), an upstream inner code rate TLV tuple (type 9), a block interleaver enable TLV tuple (type 10), an inner code block size TLV tuple (type 11) and an inner code trailing symbols TLV tuple (type 12). The symbol rate (type 1), frequency (type 2), and preamble pattern (type 3) TLV tuples are used in the manner defined in the DOCSIS RFI Specification. The burst descriptor TLV tuple (type 4) is used in the manner defined in the DOCSIS RFI Specification and also in additional ways which are discussed in reference to Table 2 below.

The mean ranging offset TLV tuple includes a 4-byte parameter that indicates the average satellite delay in milliseconds for the upstream channel identified by the UCD message. In accordance with an embodiment of the invention, average satellite delay for the channel is determined by SMTS 204 and transmitted to satellite modem 206 as part of the UCD message. This parameter is then used by satellite modem 206 to better determine when to send ranging request messages during initial maintenance. As set forth in the DOCSIS RFI specification, DOCSIS MAP messages include a ranging backoff region during which ranging request messages may be sent as part of initial maintenance. By providing satellite modem 206 with the average satellite delay for an upstream channel, an embodiment of the present invention permits this ranging to be performed using backoff regions of minimal size.

The periodic ranging interval TLV tuple includes a 4-byte parameter that defines a periodic ranging interval in seconds that will be used by SMTS 204. The DOCSIS RFI Specification requires periodic ranging of subscriber equipment to ascertain network delay and request power adjustment. In accordance with an embodiment of the invention, SMTS 204 determines its periodic ranging interval and transmits it to satellite modem 206 as part of the UCD message. This parameter is then used by satellite modem 206 to prepare a response to a periodic ranging request in advance of the periodic ranging window of opportunity.

For example, in a satellite application in accordance with an embodiment of the present invention, satellite modem 206 provides a response to a periodic ranging request that includes "state of health" information for the satellite modem as well as "piggyback" requests for upstream bandwidth. "State of health" information may include received downstream power (dBm, ½ dB units), downstream signal-to-noise ratio (¼ dB units), downstream correctable codewords since power-up or last reset, downstream uncorrectable codewords since power-up or last reset, satellite modem transmit power (dBm, ½ dB units), and satellite modem transmit frequency (kHz). By receiving the periodic ranging interval as part of the UCD message, satellite modem 206 can collect all of this data in a timely manner prior to the periodic ranging window of opportunity.

The upstream inner code rate TLV tuple comprises a 1-byte upstream inner code rate parameter. As will be appreciated by persons skilled in the relevant art(s), this parameter is useful in a satellite application in which a convolutional or Turbo inner code is used for encoding data to be sent by a satellite modem over an upstream channel. In accordance with an embodiment of the invention, SMTS 204 determines the rate of the inner code that will be used and then transmits the inner code rate to satellite modem 206 as part of the UCD message. This parameter is then used by satellite modem 206 to encode data to be sent on the upstream channel identified by the UCD message.

For example, in a satellite application in accordance with an embodiment of the present invention, a K=7 convolutional inner code is used that is identical to that described in Section 6.4 of the Digital Video Broadcasting (DVB) Standard: Interaction Channel for Satellite Distribution Systems, ETSI EN 301 790, Version 1.2.2 (2000-12), the entirety of which is incorporated by reference herein, except that only code rates of ½ and ¾ need be supported. In accordance with this embodiment, the inner code rate parameter may be set by SMTS 204 to 1, indicating that the inner code is disabled, ½, or ¾.

The block interleaver enable TLV tuple comprises a 1-byte block interleaver enable parameter. As will be appreciated by persons skilled in the relevant art(s), block interleaving refers to a codeword byte reordering process that can be used in communications systems to extend the effectiveness of Forward Error Correction (FEC) techniques such as Reed Solomon encoding. In accordance with an embodiment of the invention, SMTS 204 determines whether or not block interleaving should be used for a particular upstream channel and then sets the block interleaver enable parameter accordingly. This information is then transmitted to satellite modem 206 as part of the UCD message, which uses the parameter to determine whether to use block interleaving on the upstream channel identified by the UCD message. In accordance with an embodiment of the invention, a parameter value of 1 indicates that block interleaving is enabled and a parameter value of 2 indicates that block interleaving is disabled. However, other values may be used.

The inner code block size TLV tuple comprises a 2-byte parameter that defines the block size of the inner code. Like the upstream inner code rate parameter discussed above, this parameter is useful in a satellite application in which a convolutional or Turbo inner code is used for encoding data to be sent by a satellite modem over an upstream channel. In accordance with an embodiment of the invention, SMTS 204 determines the block size of the inner code that will be used and then transmits the inner code block size to satellite modem 206 as part of the UCD message. This parameter is then used by satellite modem 206 to encode data to be sent on the upstream channel identified by the UCD message. This parameter is particularly relevant if the inner code is a Turbo code.

The inner code trailing symbols TLV tuple comprises a 1-byte field that specifies the number of trailing symbols appended to an inner code to bring it to a known state at end of a burst. These symbols are sometimes referred to as flush bits. Like various parameters discussed above, this parameter is also useful where inner codes are used for encoding data to be sent by a satellite modem over an upstream channel. In accordance with an embodiment of the invention, SMTS 204 determines the necessary trailing symbols for an inner code that will be used and then transmits this information to satellite modem 206 as part of the UCD message. This parameter is then used by satellite modem 206 to encode data to be sent on the upstream channel identified by the UCD message.

3. Modifications to TLV-Encoded Burst Description

Figure 4:
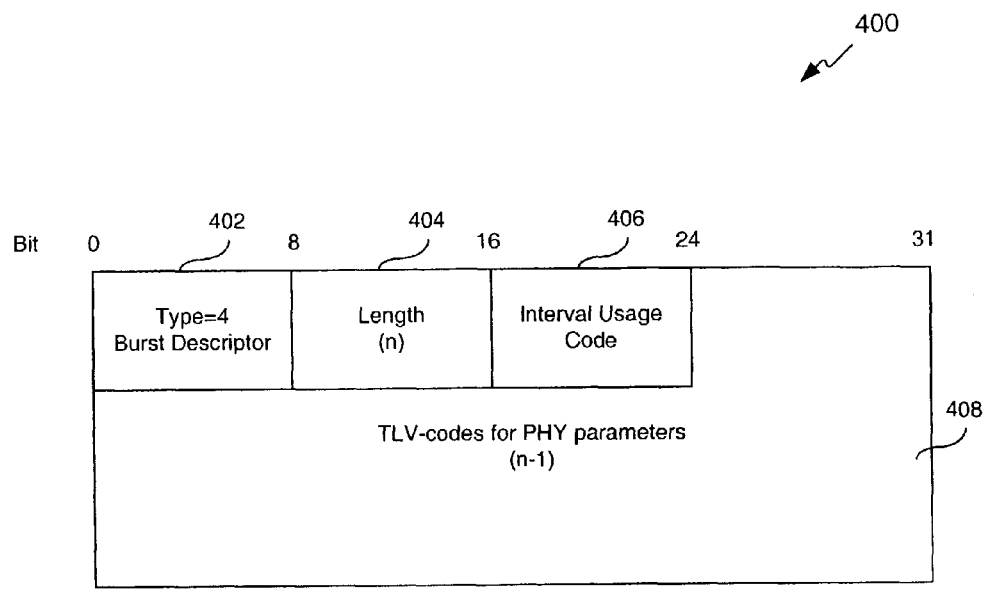
FIG. 4 illustrates a format of a TLV-encoded burst descriptor portion of a UCD message in accordance with the DOCSIS specification.

As defined by the DOCSIS RFI specification, type 4 channel TLV parameters, referred to as burst descriptors, are themselves comprised of TLV-encoded fields. FIG. 4 illustrates a format 400 of a TLV-encoded burst descriptor format for a UCD message in accordance with the DOCSIS RFI specification. As shown in FIG. 4, burst descriptors are composed of a Type Field 402, wherein the type=4, a Length field 404, and an upstream Interval Usage Code 406, followed by TLV encodings 408 that define, for each type of upstream usage interval, the physical-layer characteristics that are to be used during that interval. The upstream interval usage codes are defined as part of the DOCSIS MAP message, and are fully explained in the DOCSIS RFI specification.

Within each burst descriptor is an unordered list of physical-layer attributes, encoded as TLV tuples. Section 6.3.3 of the DOCSIS RFI specification specifies eleven types of TLV tuples (types 1-11) corresponding to TLV-encoded burst descriptors. In accordance with an embodiment of the present invention, SMTS 204 generates the same eleven types; however, satellite application-specific changes are made to the PHY parameters for various TLV tuple types: in particular, modulation type (type 1), differential encoding (type 2), FEC codeword information bytes (type 6), and last codeword length (type 10). The eleven types of TLV tuples and associated PHY parameters are set forth in Table 2.

TABLE 2

Upstream Physical Layer Attributes

| Name | Type (1 byte) | Length (1 byte) | Value (variable length) |
|---|---|---|---|
| Modulation Type | 1 | 1 | 1 = QPSK; no 16QAM |
| Differential Encoding | 2 | 1 | Not used |
| Preamble Length | 3 | 2 | See DOCSIS RFI Specification |
| Preamble Value Offset | 4 | 2 | See DOCSIS RFI Specification |
| FEC Error Correction (T) | 5 | 1 | See DOCSIS RFI Specification |
| FEC Codeword Information Bytes (k) | 6 | 1 | Replaced by number of inner code blocks per Reed Solomon codeword (k = 1 to 31) |
| Scrambler Seed | 7 | 2 | See DOCSIS RFI Specification |
| Maximum Burst Size | 8 | 1 | See DOCSIS RFI Specification |
| Guard Time Size | 9 | 1 | See DOCSIS RFI Specification |
| Last Codeword Length | 10 | 1 | 1 = fixed; no shortened codeword |
| Scrambler on/off | 11 | 1 | See DOCSIS RFI Specification |

As shown in Table 2, the modulation type TLV tuple includes a parameter that indicates the type of modulation technique to be used for upstream transmission during the relevant usage interval. In accordance with an embodiment of the present invention, SMTS 204 is required to set this value to indicate QPSK modulation only. For example, a value of 1 may be used to indicate QPSK modulation. Although the DOCSIS RFI specification indicates that both QPSK and 16 QAM modulation techniques may be used, it has been observed that only the QPSK mode is useful for satellite applications.

In accordance with an embodiment of the invention, the differential encoding TLV tuple is not used at all. Although the DOCSIS RFI specification indicates that, for this field, a value of 1 indicates that differential encoding is on and a value of 2 indicates that differential encoding is off, satellite applications are being developed that do not use differential encoding. Thus, SMTS 204 may leave this field blank or alternately, always force it to indicate that differential encoding is off.

In accordance with an embodiment of the invention, the FEC codeword information bytes TLV tuple is used to convey information pertaining to the number of inner code blocks per Reed Solomon codeword. Thus, although the DOCSIS RFI specification indicates that, for this field, a value of 16 to 253 may be used corresponding to the number of information bytes per Reed Solomon codeword, SMTS 204 instead provides a value of 1 to 31 corresponding to the number of inner code blocks per Reed Solomon codeword, thereby providing the same information in a format that supports satellite implementation.

As shown in Table 2, the last codeword length TLV tuple includes a last codeword length parameter. According to the DOCSIS RFI specification, this parameter can be set to 1 to indicate that fixed codeword lengths should be used for Forward Error Correction, and set to 2 to indicate that shortened FEC codewords are to be used. In accordance with an embodiment of the present invention, only fixed codeword lengths are used for satellite applications, and thus SMTS 204 always sets this field to indicate fixed codeword lengths only.

Figure 5:
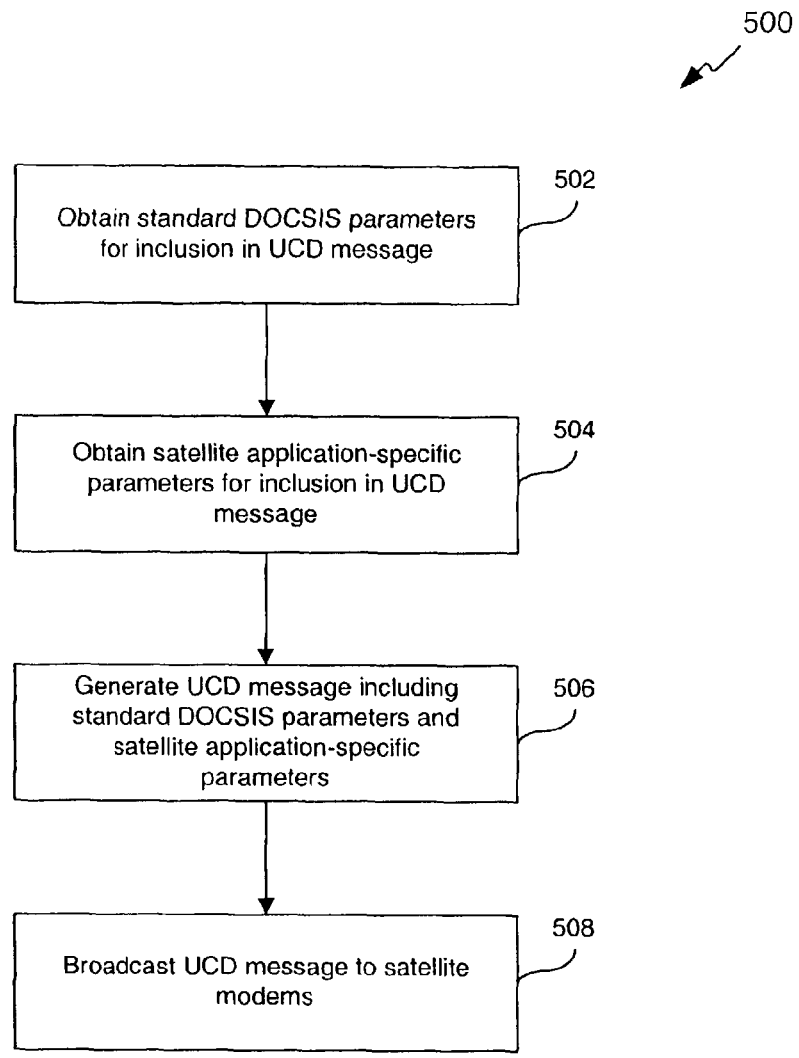
FIG. 5 depicts a flowchart of a method for generating UCD messages in accordance with an embodiment of the present invention.

C. Method for Generating and Processing UCD Messages in Accordance with an Embodiment of the Present Invention FIG. 5 depicts a flowchart 500 of a method for generating UCD messages in accordance with an embodiment of the present invention. The invention, however, is not limited to the description provided by the flowchart 500. Rather, it will be apparent to persons skilled in the relevant art(s) from the teachings provided herein that other functional flows are within the scope and spirit of the present invention. The flowchart 500 will be described with continued reference to two-way satellite communications system 200 of FIG. 2, although the invention is not limited to that embodiment.

The method of flowchart 500 begins at step 502, in which SMTS 204 obtains standard DOCSIS parameters for inclusion in a UCD message. Such parameters may include, for example, any information used to populate any of the fields of a standard DOCSIS UCD message as set forth in the DOCSIS RFI specification and as depicted in FIG. 3, including the MAC Management Message Header 302, Upstream Channel Identifier (ID) 304, Configuration Change Count 306, Minislot Size 308, Downstream Channel ID 310, TLV-encoded Information for the Overall Channel 312, TLV-encoded Burst Description 314, and TLV-encoded Information for the Subsequent Burst Descriptors 316.

At step 504, SMTS 204 obtains satellite application-specific parameters for inclusion in the UCD message, wherein the satellite application-specific parameters are not provided for by the DOCSIS RFI specification, or are different from those defined by the DOCSIS RFI specification. As described in section B, above, these parameters may include, but are not limited to, an Entry Order Wire Indicator (EOWI), a mean ranging offset, a periodic ranging interval, an upstream inner code rate, a block interleaver enable indicator, an inner code block size, inner code trailing symbols, and/or a number of inner code blocks per Reed Solomon codeword.

At step 506, UCD message generator 212 within SMTS 204 formats a UCD message including both the standard DOCSIS parameters obtained in step 502 and the satellite application-specific parameters obtained in step 504. In accordance with an embodiment of the present invention, although UCD message generator 212 includes satellite application-specific parameters in the UCD message that are not provided by DOCSIS, or are different from those provided by DOCSIS, UCD message generator 212 nevertheless generates a UCD message that adheres to the basic UCD message format set forth in the DOCSIS RFI specification and depicted in FIG. 3. This ensures that SMTS 204 will be backward-compatible with conventional DOCSIS-compliant satellite modems that are designed to receives UCD messages in this format.

At step 508, SMTS 204 broadcasts the UCD message generated in step 506 over a downstream channel of two-way satellite communications system 200 for receipt by multiple satellite modems, such as satellite modem 206.

Figure 6:
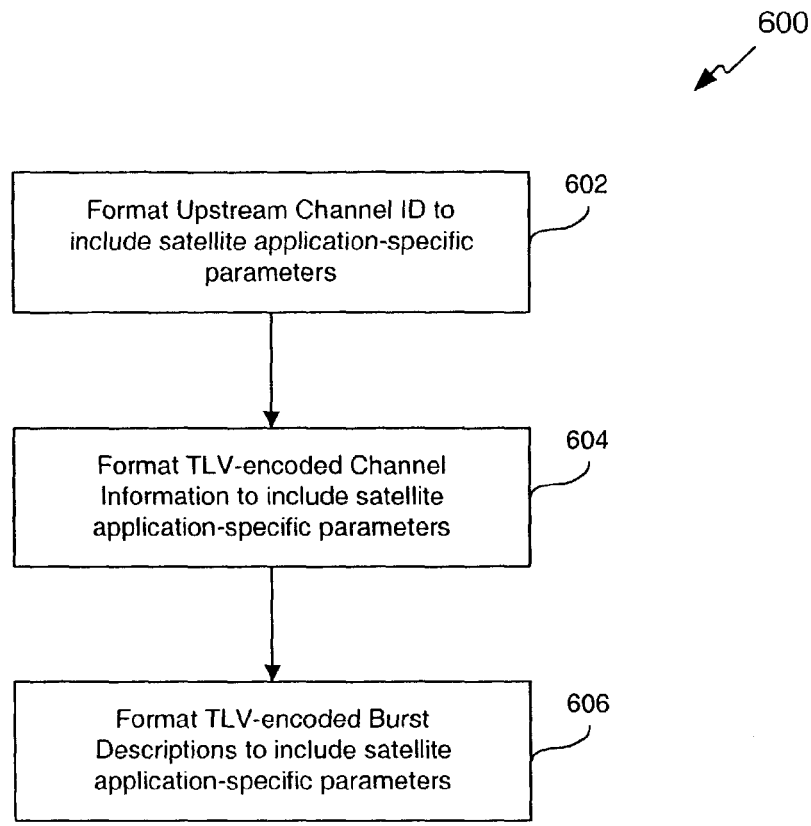
FIG. 6 depicts a flowchart of a method for generating UCD messages in accordance with an embodiment of the present invention.

FIG. 6 depicts a flowchart 600 of a method by which UCD message generator 212 within SMTS 204 generates UCD messages in accordance with an embodiment of the present invention. The invention, however, is not limited to the description provided by the flowchart 600. Rather, it will be apparent to persons skilled in the relevant art(s) from the teachings provided herein that other functional flows are within the scope and spirit of the present invention.

The method of flowchart 600 begins at step 602, in which UCD message generator 212 formats the Upstream Channel ID field of the UCD message to include satellite application-specific parameters. For example, in an embodiment, UCD message generator 212 formats the Upstream Channel ID field to include an Entry Order Wire Indicator (EOWI), which is described above in Section B.

At step 604, UCD message generator 212 formats TLV-encoded information for the overall channel to include satellite application-specific parameters. For example, in an embodiment, UCD message generator 212 formats the TLV-encoded information for the overall channel to include at least one of a mean ranging offset, a periodic ranging interval, an upstream inner code rate, a block interleaver enable indicator, an inner code block size, and/or inner code trailing symbols, each of which is described above in Section B.

At step 606, UCD message generator 212 formats TLV-encoded burst descriptors to include satellite application-specific parameters. For example, in an embodiment, UCD message generator 212 formats TLV-encoded burst descriptors to include a number of inner code blocks per Reed Solomon codeword, to not use differential encoding parameters, to require a QPSK modulation type, and/or to require a fixed last codeword length, as more fully described above in Section B.

Figure 7:
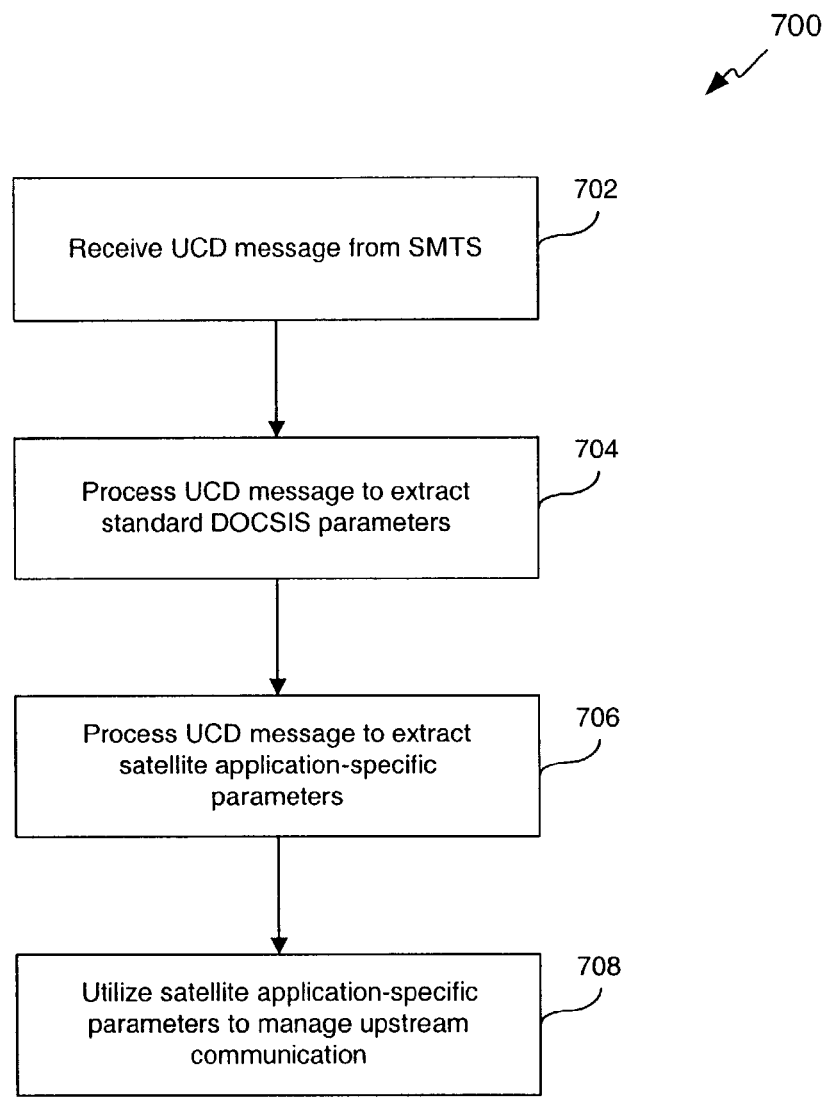
FIG. 7 depicts a flowchart of a method for processing UCD messages in accordance with an embodiment of the present invention.

FIG. 7 depicts a flowchart 700 of a method for processing UCD messages in accordance with an embodiment of the present invention. The invention, however, is not limited to the description provided by the flowchart 700. Rather, it will be apparent to persons skilled in the relevant art(s) from the teachings provided herein that other functional flows are within the scope and spirit of the present invention. The flowchart 700 will be also described with continued reference to two-way satellite communications system 200 of FIG. 2, although the invention is not limited to that embodiment.

The method of flowchart 700 begins at step 702, in which satellite modem 206 receives a UCD message broadcast by SMTS 204 in accordance with the method of flowchart 500 described above in reference to FIG. 5.

At step 704, UCD message processor 214 within satellite modem 206 processes the UCD message to extract standard DOCSIS parameters. Such parameters may include, for example, any of the fields of a standard DOCSIS UCD message as set forth in the DOCSIS RFI specification and as depicted in FIG. 3, including the MAC Management Message Header 302, Upstream Channel Identifier (ID) 304, Configuration Change Count 306, Minislot Size 308, Downstream Channel ID 310, TLV-encoded Information for the Overall Channel 312, TLV-encoded Burst Description 314, and TLV-encoded Information for the Subsequent Burst Descriptors 316.

At step 706, UCD message processor 214 within modem SMTS 206 further processes the UCD message to extract satellite application-specific parameters, wherein the satellite application-specific parameters are not provided for by the DOCSIS RFI specification, or are different from those defined by the DOCSIS RFI specification. As described in section B, above, these parameters may include, but are not limited to, an Entry Order Wire Indicator (EOWI), a mean ranging offset, a periodic ranging interval, an upstream inner code rate, a block interleaver enable indicator, an inner code block size, inner code trailing symbols, and/or a number of inner code blocks per Reed Solomon codeword.

At step 708, satellite modem 206 utilizes the satellite application-specific parameters extracted in step 706 to manage upstream communication over the upstream channel referred to by the UCD message processed in steps 704 and 706.

Figure 8:
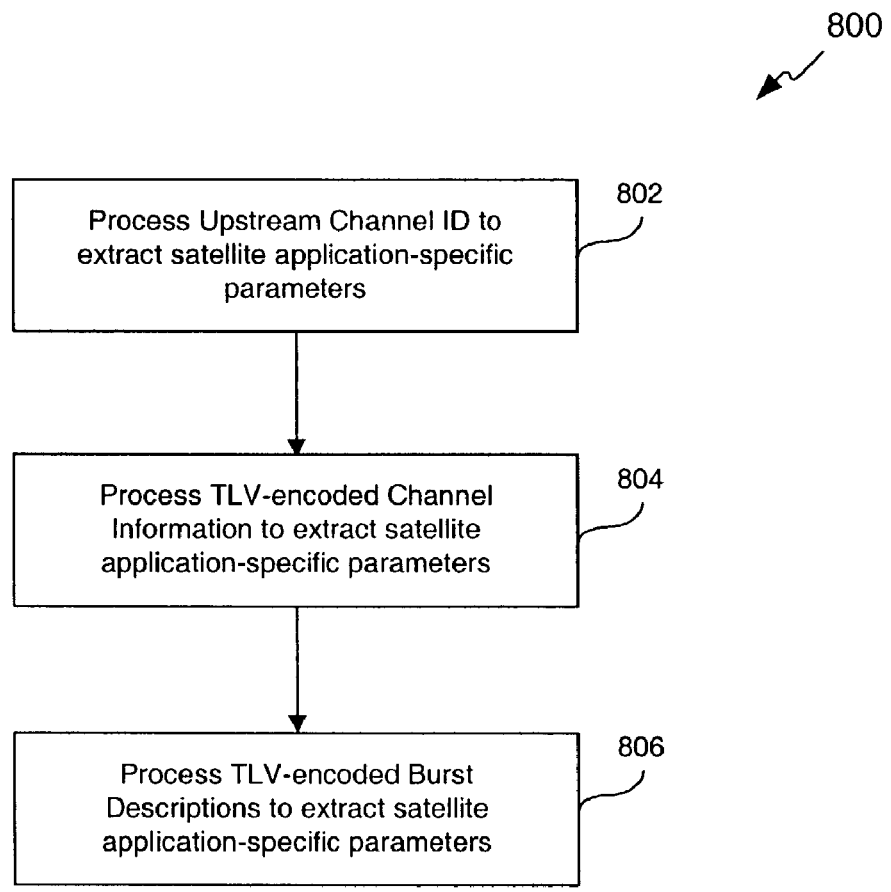
FIG. 8 depicts a flowchart of a method for processing UCD messages in accordance with an embodiment of the present invention.

FIG. 8 depicts a flowchart 800 of a method by which UCD message processor 214 within satellite modem 206 processes UCD messages in accordance with an embodiment of the present invention. The invention, however, is not limited to the description provided by the flowchart 800. Rather, it will be apparent to persons skilled in the relevant art(s) from the teachings provided herein that other functional flows are within the scope and spirit of the present invention.

The method of flowchart 800 begins at step 802, in which UCD message processor 214 processes the Upstream Channel ID field of the UCD message to identify and extract satellite application-specific parameters. For example, in an embodiment, UCD message processor 214 parses the Upstream Channel ID field to identify and extract an Entry Order Wire Indicator (EOWI), which is described above in Section B.

At step 804, UCD message processor 214 processes the TLV-encoded information for the overall channel to identify and extract satellite application-specific parameters. For example, in an embodiment, UCD message processor 214 parses the TLV-encoded information for the overall channel to identify and extract at least one of a mean ranging offset, a periodic ranging interval, an upstream inner code rate, a block interleaver enable indicator, an inner code block size, and/or inner code trailing symbols, each of which is described above in Section B.

At step 806, UCD message processor 214 processes the TLV-encoded burst descriptors to identify and extract satellite application-specific parameters. For example, in an embodiment, UCD message processor 214 parses TLV-encoded burst descriptors to identify and extract a number of inner code blocks per Reed Solomon codeword, which is described above in Section B. In accordance with an embodiment of the present invention, UCD message processor 214 also does not extract differential encoding parameters from the burst descriptor, and expects to extract a modulation type of QPSK only and a last codeword length type of fixed only, as more fully described above in Section B.

D. Processor-Based Implementations

Figure 9:
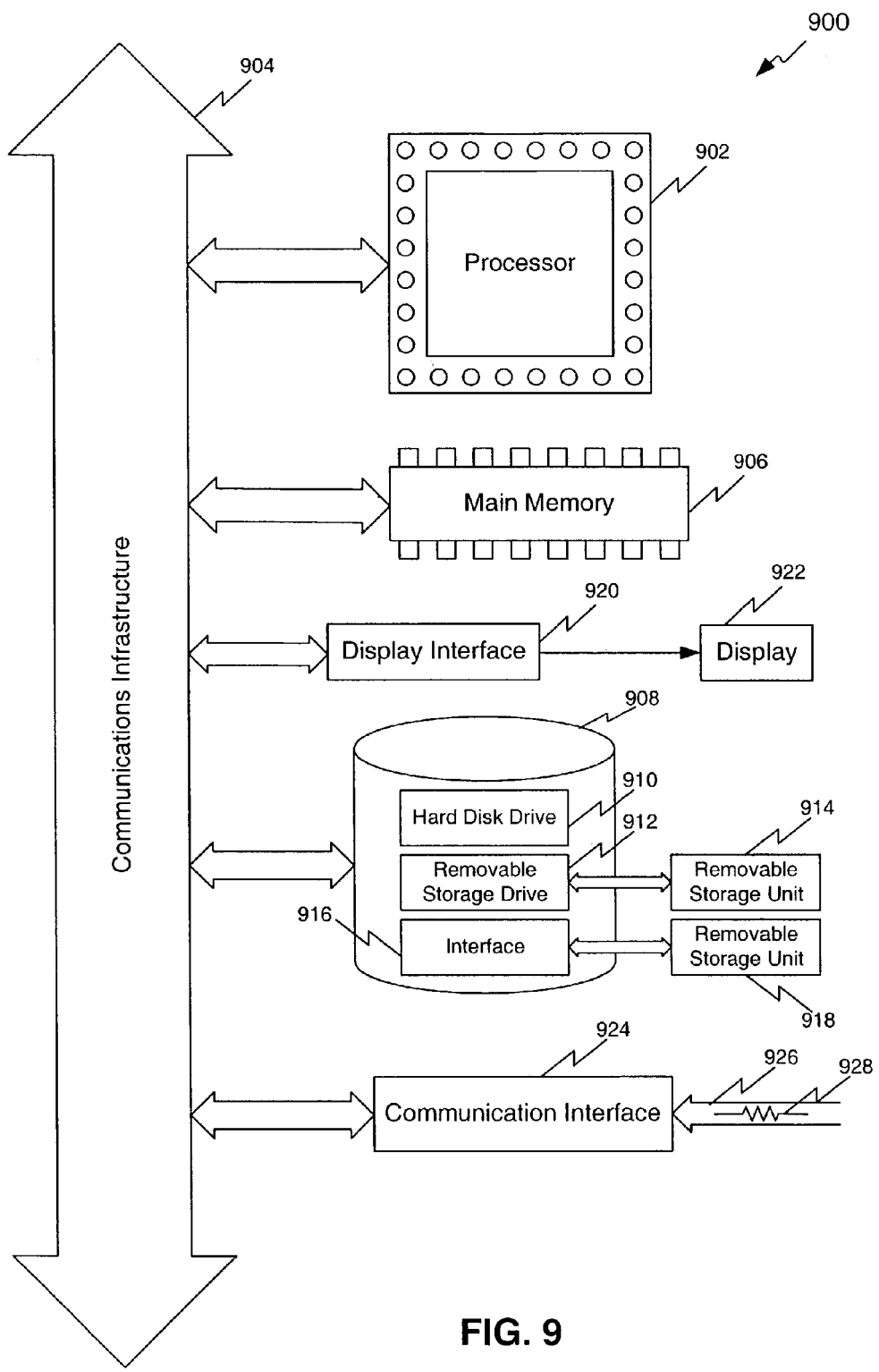
FIG. 9 depicts a processor-based computer system for implementing various features of the present invention.

As will be appreciated by persons skilled in the relevant art(s), the functions of SMTS 204, UCD message generator 212, satellite modem 206, and UCD message processor 214 may be implemented in software and executed by one or more processor-based computer systems. FIG. 9 depicts an example computer system 900 that may execute software for implementing the features of the present invention, including, but not limited to, any or all of the method steps of flowcharts 500, 600, 700 and 800 described above in reference to FIGS. 5, 6, 7 and 8, respectively.

As shown in FIG. 9, example computer system 900 includes a processor 902 for executing software routines in accordance with embodiments of the present invention. Although a single processor is shown for the sake of clarity, computer system 900 may also comprise a multi-processor system. Processor 902 is connected to a communications infrastructure 904 for communication with other components of computer system 900. Communications infrastructure 904 may comprise, for example, a communications bus, crossbar, or network.

Computer system 900 further includes a main memory 906, such as a random access memory (RAM), and a secondary memory 908. Secondary memory 908 may include, for example, a hard disk drive 910 and/or a removable storage drive 912, which may comprise a floppy disk drive, a magnetic tape drive, an optical disk drive, flash memory, or the like. Removable storage drive 912 reads from and/or writes to a removable storage unit 914 in a well known manner. Removable storage unit 914 may comprise a floppy disk, magnetic tape, optical disk, or the like, which is read by and written to by removable storage drive 912. As will be appreciated by persons skilled in the relevant art(s), removable storage unit 914 includes a computer usable storage medium having stored therein computer software and/or data.

In alternative embodiments, secondary memory 908 may include other similar means for allowing computer programs or other instructions to be loaded into computer system 900. Such means can include, for example, a removable storage unit 918 and an interface 916. Examples of a removable storage unit 918 and interface 916 include a program cartridge and cartridge interface (such as that found in video game console devices), a removable memory chip (such as an EPROM, or PROM) and associated socket, and other removable storage units 918 and interfaces 916 that allow software and data to be transferred from removable storage unit 918 to computer system 900.

Computer system 900 further includes a display interface 920 that forwards graphics, text, and other data from communications infrastructure 904 or from a frame buffer (not shown) for display to a user on a display unit 922.

Computer system 900 also includes a communication interface 924. Communication interface 924 allows software and data to be transferred between computer system 900 and external devices via a communication path 926. Examples of communication interface 924 include a modem, a network interface (such as Ethernet card or 802.11b interface), a communication port, and the like. Software and data transferred via communication interface 924 are in the form of signals 928 which can be electronic, electromagnetic, optical or other signals capable of being received by communication interface 924. These signals 928 are provided to communication interface 924 via communication path 926.

As used herein, the term "computer program product" may refer, in part, to removable storage unit 914, removable storage unit 918, or a hard disk installed in hard disk drive 910. A computer useable medium can include magnetic media, optical media, or other recordable media. These computer program products are means for providing software to computer system 900.

Computer programs (also called computer control logic) are stored in main memory 906 and/or secondary memory 908. Computer programs can also be received via communication interface 924. Such computer programs, when executed, enable computer system 900 to perform the features of the present invention as discussed herein. In particular, the computer programs, when executed, enable processor 902 to perform the features of the present invention. Accordingly, such computer programs represent controllers of the computer system 900.

The features of the present invention can be implemented as control logic in software, firmware, hardware or any combination thereof. In an embodiment where features of the present invention are implemented using software, the software may be stored in a computer program product and loaded into computer system 900 using removable storage drive 912, hard disk drive 910 or communication interface 924. Alternatively, the computer program product may be downloaded to computer system 900 over communication path 926. The software, when executed by processor 902, causes processor 902 to perform features of the invention as described herein.

In another embodiment, features of the present invention are implemented in firmware and/or hardware using, for example, hardware components such as application specific integrated circuits (ASICs). Implementation of a hardware state machine so as to perform the functions described herein will be apparent to persons skilled in the relevant art(s) from the teachings herein.

E. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. For example, the present invention is not limited to two-way satellite communications system as described herein, but is equally applicable to any DOCSIS-based broadband communications system. Accordingly, the breadth and scope of the present invention should not be limited by any of the above-described exemplary embodiments, but should be defined only in accordance with the following claims and their equivalents.

What is claimed is:

1. A method for generating upstream channel descriptor (UCD) messages in a two-way satellite communications system comprising:
    obtaining one or more standard parameters pertaining to an upstream channel of the two-way satellite communications system, wherein said one or more standard parameters are defined in accordance with a Data Over Cable Service Interface Specification (DOCSIS) protocol;
    obtaining one or more satellite application-specific parameters pertaining to said upstream channel, wherein said one or more satellite application specific parameters are not provided for by said DOCSIS protocol;
    formatting an upstream channel identifier portion of a DOCSIS UCD message to include said one or more standard parameters and said one or more satellite application-specific parameters; and broadcasting said DOCSIS UCD message over a downstream channel of the two-way satellite communications system.

2. The method of claim 1, wherein said formatting the upstream channel comprises formatting said upstream channel identifier portion of said DOCSIS UCD message to include a parameter that indicates whether said upstream channel described by said DOCSIS UCD message supports initial maintenance.

3. A method for generating upstream channel descriptor (UCD) messages in a two-way satellite communications system comprising:

obtaining one or more standard parameters pertaining to an upstream channel of the two-way satellite communications system, wherein said one or more standard parameters are defined in accordance with a Data Over Cable Service Interface Specification (DOCSIS) protocol;

obtaining one or more satellite application-specific parameters pertaining to said upstream channel, wherein said one or more satellite application specific parameters are not provided for by said DOCSIS protocol;

formatting a type/length/value (TLV)-encoded burst descriptor portion of a DOCSIS UCD message to include said one or more standard parameters and said one or more satellite application-specific parameters; and broadcasting said DOCSIS UCD message over a downstream channel of the two-way satellite communications system, wherein wherein said formatting the TLV-encoded burst descriptor portion comprises formatting said TLV-encoded burst descriptor portion of said DOCSIS UCD message to include a number of inner code blocks per Reed Solomon codeword that supports both the DOCSIS protocol and the two-way satellite communications system.

4. A satellite modem termination system (SMTS), the SMTS adapted to obtain one or more standard parameters pertaining to an upstream channel of a two-way satellite communications system, wherein the standard parameters are defined in accordance with a Data Over Cable Service Interface Specification (DOCSIS) protocol, and to obtain one or more satellite application-specific parameters pertaining to the upstream channel, wherein the one or more satellite application specific parameters are not provided for by the DOCSIS protocol, the SMTS comprising:

an Upstream Channel Descriptor (UCD) message generator adapted to format an upstream channel identifier portion of a DOCSIS UCD message including the one or more standard parameters and the one or more satellite application-specific parameters; and a transmitter for broadcasting said DOCSIS UCD message over a downstream channel of the two-way satellite communications system.

5. The SMTS of claim 4, wherein said UCD message generator is configured to format said upstream channel identifier portion of said DOCSIS UCD message to include a parameter that indicates whether said upstream channel described by said DOCSIS UCD message supports initial maintenance.

6. A satellite modem termination system (SMTS), the SMTS configured to obtain one or more standard parameters pertaining to an upstream channel of a two-way satellite communications system, wherein the standard parameters are defined in accordance with a Data Over Cable Service Interface Specification (DOCSIS) protocol, and to obtain one or more satellite application-specific parameters pertaining to the upstream channel, wherein the one or more satellite application specific parameters are not provided for by the DOCSIS protocol, the SMTS comprising:

an Upstream Channel Descriptor (UCD) message generator configured to format a type/length/value (TLV)-encoded channel information portion of a DOCSIS UCD message including the one or more standard parameters and the one or more satellite application-specific parameters; and a transmitter for broadcasting said DOCSIS UCD message over a downstream channel of the two-way satellite communications system, wherein said UCD message generator is configured to format said TLV-encoded channel information portion of said DOCSIS UCD message to include at least one of: a mean ranging offset, a periodic ranging interval, an upstream inner code rate, a block interleaver enable indicator, an inner code block size, or inner code trailing symbols.

7. A satellite modem termination system (SMTS), the SMTS configured to obtain one or more standard parameters pertaining to an upstream channel of a two-way satellite communications system, wherein the standard parameters are defined in accordance with a Data Over Cable Service Interface Specification (DOCSIS) protocol, and to obtain one or more satellite application-specific parameters pertaining to the upstream channel, wherein the one or more satellite application specific parameters are not provided for by the DOCSIS protocol, the SMTS comprising:

an Upstream Cannel Descriptor (UCD) message generator configured to format a type/length/value (TLV)-encoded channel information portion of a DOCSIS UCD message including the one or more standard parameters and the one or more satellite application-specific parameters; and a transmitter for broadcasting said DOCSIS UCD message over a downstream channel of the two-way satellite communications system, wherein said UCD message generator is configured to format said TLV-encoded burst descriptor portion of said DOCSIS UCD message to include a number of inner code blocks per Reed Solomon codeword that supports both the DOCSIS protocol and the two-way satellite communications system.

8. A computer program product comprising a non-transitory computer useable medium having computer program logic recorded thereon that, when executed by a processor, generates upstream channel descriptor (UCD) messages for use in a two-way satellite communications system, said computer program logic comprising:

first computer readable program code that enables the processor to obtain one or more standard parameters pertaining to an upstream channel of the two-way satellite communications system, wherein said one or more standard parameters are defined in accordance with a Data Over Cable Service Interface Specification (DOCSIS) protocol;

second computer readable program code that enables the processor to obtain one or more satellite application-specific parameters pertaining to said upstream channel, wherein said one or more satellite application specific parameters are not provided for by said DOCSIS protocol;

third computer readable program code that enables the processor to format an upstream channel identifier portion of a DOCSIS UCD message including said one or more standard parameters and said one or more satellite application-specific parameters; and fourth computer readable program code that enables the processor to broadcast said DOCSIS UCD message over a downstream channel of the two-way satellite communications system.

9. The computer program product of claim 8, wherein said fifth computer readable program code comprises sixth computer readable program that enables the processor to format said upstream channel identifier portion of said DOCSIS UCD message to include a parameter that indicates whether said upstream channel described by said DOCSIS UCD message supports initial maintenance.

10. A computer program product comprising a non-transitory computer useable medium having computer program logic recorded thereon that, when executed by a processor, generates upstream channel descriptor (UCD) messages for use in a two-way satellite communications system, said computer program logic comprising:

first computer readable program code that enables the processor to obtain one or more standard parameters pertaining to an upstream channel of the two-way satellite communications system, wherein said one or more standard parameters are defined in accordance with a Data Over Cable Service Interface Specification (DOCSIS) protocol;

second computer readable program code that enables the processor to obtain one or more satellite application-specific parameters pertaining to said upstream channel, wherein said one or more satellite application specific parameters are not provided for by said DOCSIS protocol;

third computer readable program code that enables the processor to format a type/length/value (TLV)-encoded channel information portion of a DOCSIS UCD message including said one or more standard parameters and said one or more satellite application-specific parameters; and fourth computer readable program code that enables the processor to broadcast said DOCSIS UCD message over a downstream channel of the two-way satellite communications system, wherein wherein said third computer readable program code enables the processor to format said TLV-encoded burst descriptor portion of said DOCSIS UCD message to include a number of inner code blocks per Reed Solomon codeword that supports both the DOCSIS protocol and the two-way satellite communications system.

11. A method for generating upstream channel descriptor (UCD) messages in a two-way satellite communications system comprising:

obtaining one or more standard parameters pertaining to an upstream channel of the two-way satellite communications system, wherein said one or more standard parameters are defined in accordance with a Data Over Cable Service Interface Specification (DOCSIS) protocol;

obtaining one or more satellite application-specific parameters pertaining to said upstream channel, wherein said one or more satellite application specific parameters are not provided for by said DOCSIS protocol and wherein said one or more satellite application specification parameters include at least one of a mean ranging offset, a periodic ranging interval, an upstream inner code rate, a block interleaver enable indicator, an inner code block size, or inner code trailing symbols;

formatting one or more portions of a DOCSIS UCD message to include said one or more standard parameters and said one or more satellite application-specific parameters; and broadcasting said DOCSIS UCD message over a downstream channel of the two-way satellite communications system.

12. The method of claim 11, wherein said formatting one or more portions of the DOCSIS UCD message comprises formatting a type/length/value (TLV)-encoded channel information portion of said DOCSIS UCD message to include one of said one or more satellite application-specific parameters.

* * * * *

UNITED STATES PATENT AND TRADEMARK OFFICE
CERTIFICATE OF CORRECTION

| | |
|---|---|
| PATENT NO. | : 8,098,606 B2 |
| APPLICATION NO. | : 10/420805 |
| DATED | : January 17, 2012 |
| INVENTOR(S) | : Dale et al. |

It is certified that error appears in the above-identified patent and that said Letters Patent is hereby corrected as shown below:

Column 14
Line 64, Claim 1, replace "application specific" with --application-specific--.

Column 15
Line 2, Claim 3, replace "application specific" with --application-specific--.

Column 15
Line 31, Claim 3, replace "system, wherein" with --system,--.

Column 15
Lines 45-46, Claim 4, replace "application specific" with --application-specific--.

Column 16
Lines 2-3, Claim 6, replace "application specific" with --application-specific--.

Column 16
Lines 28-29, Claim 7, replace "application specific" with --application-specific--.

Column 16
Line 62, Claim 8, replace "application specific" with --application-specific--.

Column 17
Line 31, Claim 10, replace "application specific" with --application-specific--.

Column 18
Line 4, Claim 10, replace "system, wherein" with --system,--.

Column 18
Line 20, Claim 11, replace "application specific" with --application-specific--.

Signed and Sealed this
Sixth Day of March, 2012

David J. Kappos
*Director of the United States Patent and Trademark Office*

Column 18

Line 22, Claim 11, replace "application specification" with --application-specific--.